June 13, 1939.    P. DE ASIS    2,162,066
SUBMERSIBLE AIRCRAFT
Filed Feb. 28, 1938    3 Sheets-Sheet 3
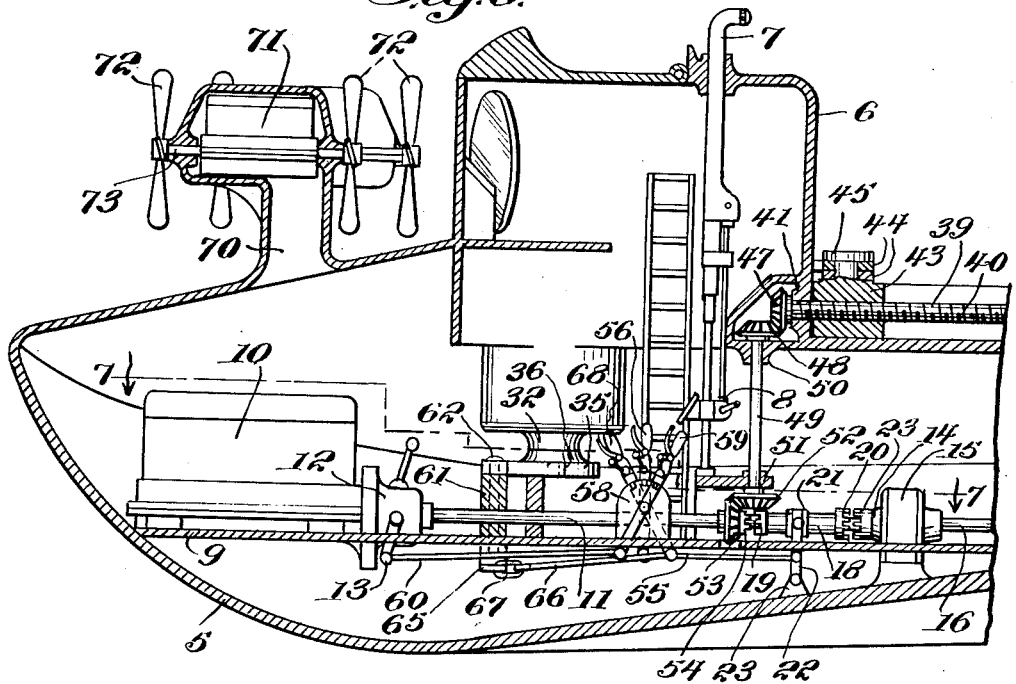
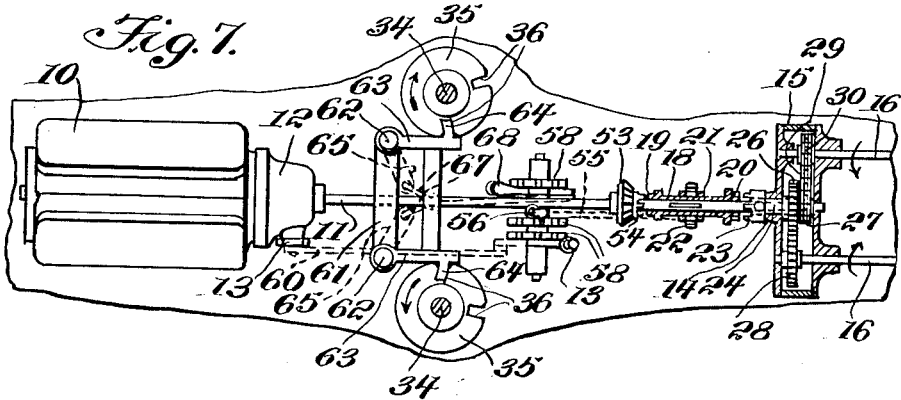
Paul De Asis
INVENTOR
BY Victor J. Evans & Co.
ATTORNEYS
J. T. L. Wright
WITNESS Patented June 13, 1939

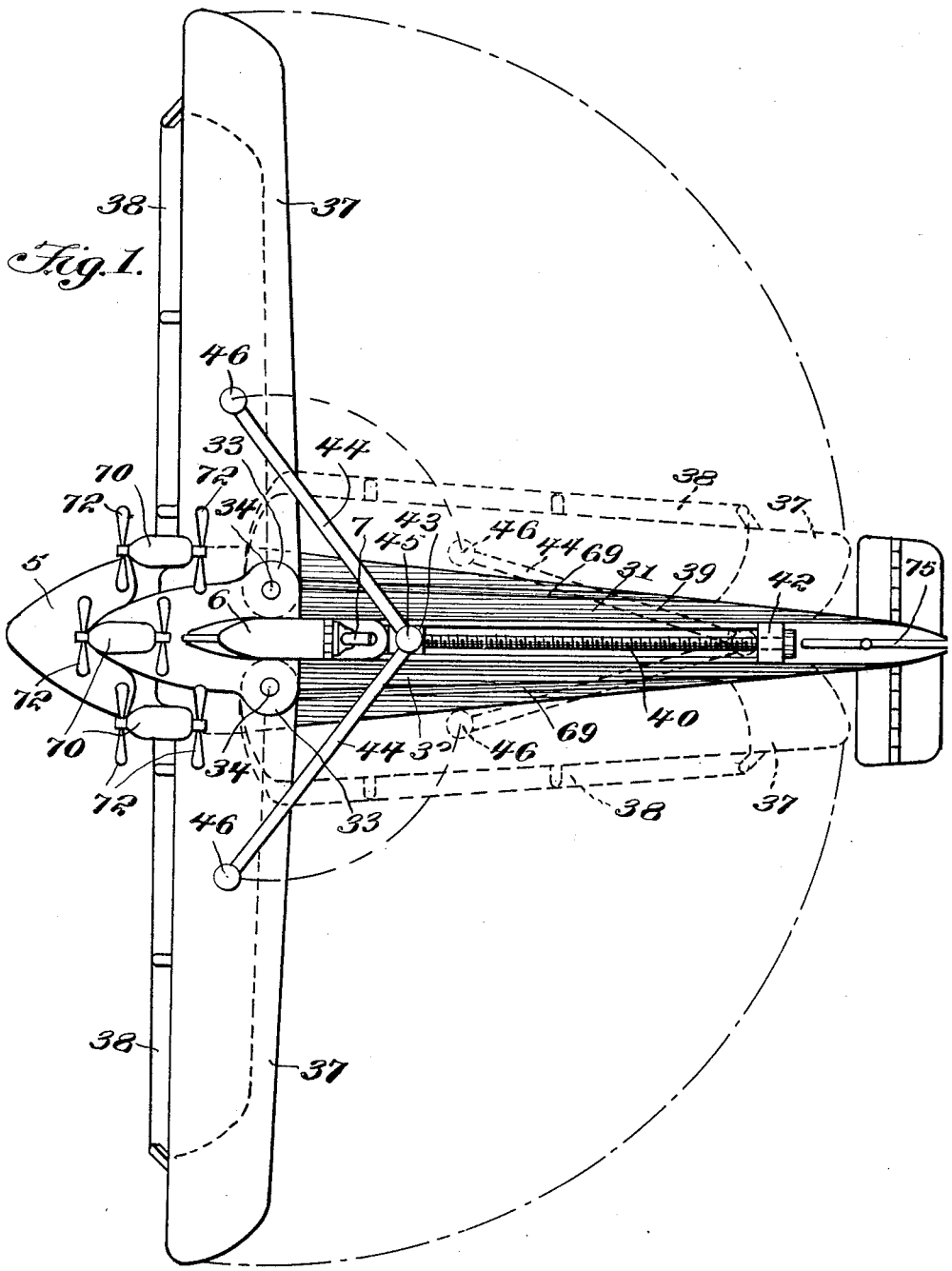

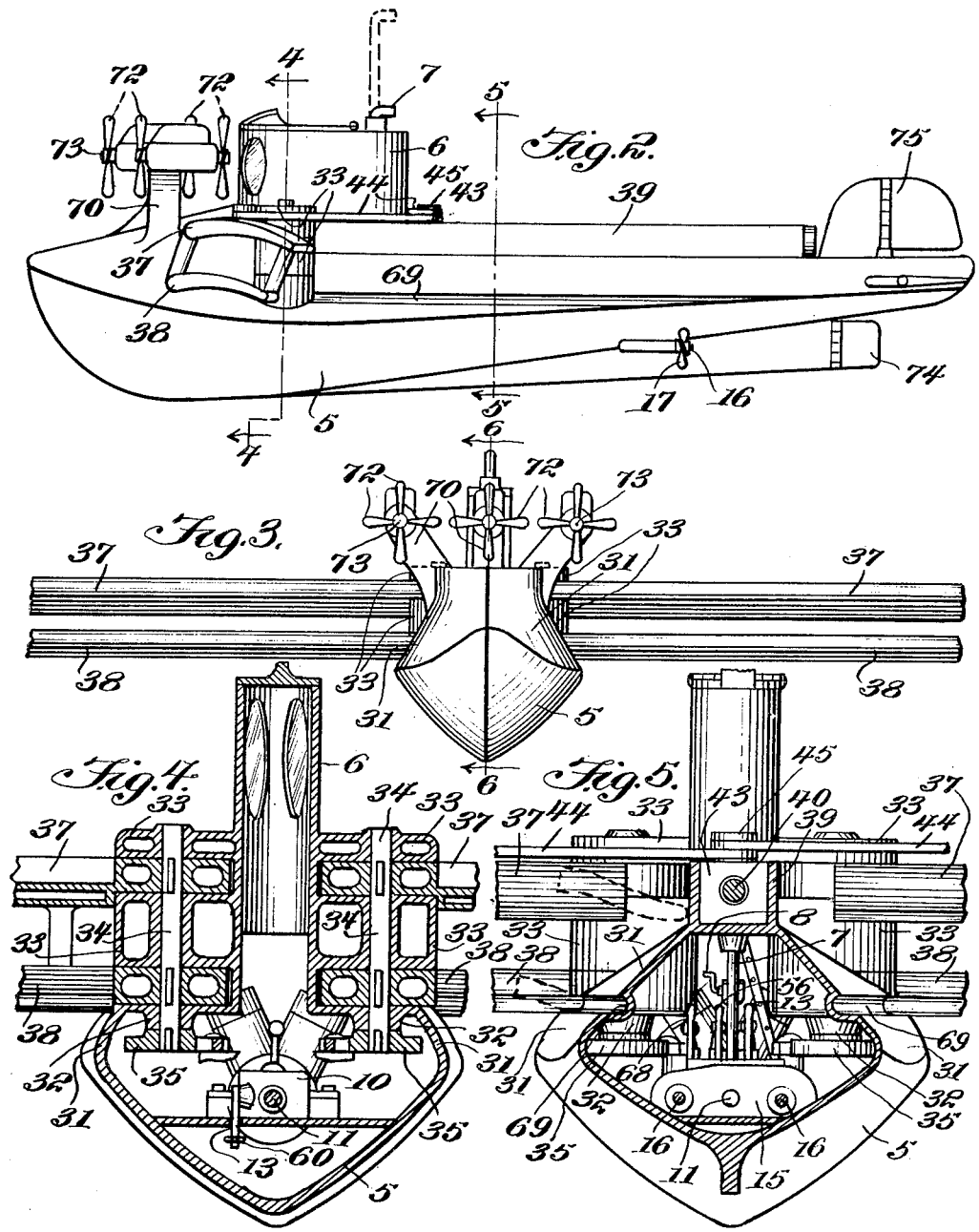

2,162,066

UNITED STATES PATENT OFFICE 2,162,066

SUBMERSIBLE AIRCRAFT

Paul De Asis, Los Angeles, Calif.

Application February 28, 1938, Serial No. 193,196

2 Claims. (Cl. 244—49)

My invention relates to a submersible aircraft and has for a primary object the provision of a craft capable of traveling in the air or on or under the water.

Another object of my invention is to provide a craft of the above described character wherein the lifting planes or wings which sustain the craft in the air are adapted to be folded or moved to a retracted position when the craft is submerged.

A further object of my invention is to provide a craft of the above described character having means for locking the wings in extended or retracted positions when the craft is being operated through the air or in the water respectively.

Other objects and advantages will be apparent from the following description, appended claims and annexed drawings.

Referring to the drawings wherein like reference characters designate like parts throughout the several views:

Figure 1 is a top plan view of my invention.

Figure 2 is a side elevation thereof.

Figure 3 is a front elevation illustrating the wings in extended position for flight in the air.

Figures 4 and 5 are sectional views taken on the lines 4—4 and 5—5 of Figure 2 respectively.

Figure 6 is a sectional view taken on the line 6—6 of Figure 3.

Figure 7 is a sectional view taken on the line 7—7 of Figure 6.

In practicing my invention I employ a submarine type of craft equipped with means (not shown) for submerging the craft in the water and fashioned with a hull 5 having the usual conning tower 6 through which extends a periscope 7 having operating mechanism 8 whereby to raise and lower the same when desired.

The hull 5 is equipped with a deck or floor 9 extending longitudinally of the craft and has mounted on the forward section thereof a motor 10 equipped with a longitudinally extending drive shaft 11 and with a transmission assembly enclosed within a transmission case 12 and operable for reversing the direction of rotation of said shaft by means of a shift lever 13.

The rearwardly extending end of the drive shaft 11 is journaled within a bearing 14 fashioned on a housing 15 in which are journaled the forwardly extending ends of a pair of propeller shafts 16, the rearwardly extending ends of said propeller shafts being equipped with the usual propellers 17 without the hull for moving the craft through the water. Slidably mounted on the drive shaft 10 is a clutch element 18 keyed thereon for rotation therewith. Said clutch element is fashioned with oppositely disposed clutch faces 19 and 20 and an intermediate groove collar 21 on which is pivoted the forked end of an actuating arm 22, the opposite end being pivotally connected to a support bracket 23 secured to the bottom of the hull.

Mounted on the shaft 11 and rotatable relative thereto is a sleeve 24 extending within the housing 15 and having secured on the outer end thereof a clutch member 23 for engagement with the clutch face 20 whereby to rotate said sleeve. Secured on the end of the sleeve 24 within the housing 15 is a gear 26 and a sprocket 27. The gear 26 meshes with a similar gear 28 secured on the inner end of one of the propeller shafts 16 while the sprocket is connected by means of a chain 29 to a similar sprocket 30 carried by the inner end of the other propeller shaft whereby said propeller shafts are driven by said drive shaft 11 upon engagement of the clutch element 25 with the clutch face 20.

The hull 5 is provided with an upper outer sloping deck 31 having fashioned thereon, on each side of said conning tower, subjacently extending bearings 32 in registry with similar shaped bearings 33 extending laterally from the conning tower and in which are journaled shafts 34, the lower end of said shafts having secured thereto latchable members 35 comprising disks having pairs of spaced slots 36 formed in the outer periphery thereof for a purpose hereinafter set forth. Keyed to said shafts 34 and mounted between said bearings 33 are upper and lower connected wings 37 and 38 respectively extending from each side of said hull for sustaining the craft during flight in the air.

The upper deck 31 is fashioned with a longitudinally extending channeled section 39 in which is mounted a longitudinally extending threaded shaft 40, the forward end of said shaft being journaled in a bearing 41 formed in the conning tower and the opposite end journaled in a bearing 42 formed in said channeled section at the stern thereof. A movable member 43 is threadedly mounted on said shaft 40 and is adapted for movement relative thereto by rotation of said shaft. A pair of links 44 have rearwardly extending ends pivoted to said member 43 by means of a pivot pin 45 and the opposite ends pivotally connected to the upper wings 37 by means of similar pivot pins 46 whereby movement of the member 43 towards the stern of the craft serves to pivot the wings into retracted position and movement of the member in an opposite direction pivots the wings into extended position as illustrated in Figures 1 and 2 of the drawings. The retracted position is illustrated in dotted lines in Figure 1. The inner end of the threaded shaft 40 has fixed thereto a bevel gear 47 in mesh with a similar gear 48 secured on the upper end of a shaft 49.

The upper end of the shaft 49 is journaled in a bearing 50 formed subjacently on the deck 31 while the lower end of the shaft is journaled in a bearing 51 carried by a bracket secured to the deck 9. A bevel gear 52 is fixed on the lower end of the shaft 49 and in mesh with a similar gear 53 rotatably mounted on the drive shaft 11 and having a clutch element or face 54 for engagement with the clutch face 19 of the sleeve 18 whereby to rotate the shafts 49 and 40, operate the member 43 and move the wings 37 and 38 to a desired position.

The clutch faces 19 and 20 carried by the sleeve 18 are operated for engagement with the faces 54 and 25 through the medium of a link 55 having one end connected to the arm 22 and the opposite end to a lever 56 pivoted on a shaft carried by a trio of segments 58, said lever being provided with a dog for engagement with the teeth of one of the segments whereby to maintain the sleeve in adjusted position. Pivotally mounted on the shaft is a second lever 59 of similar construction and connected to the shift lever 13 by means of a rod 60 whereby to effect a forward and reverse operation of the shaft 11.

Mounted on the deck 9 is a bearing standard 61 having shafts 62 journaled therethrough, the upper ends of said shafts having fixed thereto arms 63 formed with latch bolts 64 for engagement within the slots 36 of the latchable member 35 keyed to the shafts 34. The lower ends of the shafts 62 have fixed thereto arms 65 pivotally connected to one end of a rod 66 by means of links 67; the opposite end of the rod 66 is connected to an operating lever 68 mounted on the shaft 57 and similar in construction to the levers 56 and 59. One of the slots 36 in each of the members 35 are adapted to receive the bolts 64 when the wings 37 and 38 are in extended position and the other slots adapted to receive said bolts when the wings are in retracted position. The bolts are operated into and out of said slots through the operation of the lever 68 and connected parts. This construction serves to lock the wings in extended or retracted position as the case may be. Formed in the outer face of the upper deck 31 are longitudinally extending recesses 69 to receive the rear edges of the lower wings 38 when said wings have been moved to retracted position.

Standards 70 are secured on the upper deck 31 forward of the conning tower 6 and support therein flight motors 71 for operating propellers 72 mounted on the respective motor shafts 73.

From the foregoing it will be apparent that when the craft is submerged, the wings may be moved to retracted position through the medium of the mechanism heretofore described connected to the drive shaft 11 and said drive shaft functions to propel the craft through the water. By reversing the drive shaft, effecting a disconnection thereof with the propeller shafts, connecting the shaft 49 thereto by means of the clutch elements 19 and 54, the wings may be moved to extended position to permit operation of the craft through the air.

The craft is provided with a rudder 74 secured to the stern thereof whereby to steer the same through the water and likewise provided with a rudder assembly 75 for guiding said craft through the air.

What I claim is:

1. A craft of the class described, comprising, a submersible hull, a motor within said hull and equipped with a drive shaft, propeller shafts having propellers for moving said craft through the water, clutch mechanism for effecting connection of said drive shaft with said propeller shafts whereby to operate the same, wings pivotally mounted on said hull and movable to retracted and extended positions relative thereto, a longitudinally extending shaft secured to said hull, a member threadedly operated on said shaft, links connecting said wings to said member, clutch mechanism carried by said drive shaft and connected to said longitudinally extending shaft whereby to move said wings to retracted and extended positions, and means for positively effecting asynchronous operation of said first mentioned and last mentioned clutch mechanisms whereby said longitudinal shaft is operable only when said propeller shafts are inactive.

2. A craft of the class described, comprising, a submersible hull, a motor within said hull and equipped with a drive shaft, propeller shafts having propellers for moving said craft through the water, clutch mechanism for effecting connection of said drive shaft with said propeller shafts whereby to operate the same, wings pivotally mounted on said hull and movable to retracted and extended positions relative thereto, a longitudinally extending shaft secured to said hull, a member threadedly operated on said shaft, links connecting said wings to said member, clutch mechanism carried by said drive shaft and connected to said longitudinally extending shaft whereby to move said wings to retracted and extended positions, means for positively effecting asynchronous operation of said first mentioned and last mentioned clutch mechanisms whereby said longitudinal shaft is operable only when said propeller shafts are inactive, shafts connected to said wings and extending within said hull and having latchable members secured thereon, and means within said hull for engaging with said members whereby to latch said wings in retracted and extended positions respectively.

PAUL DE ASIS.